US012694742B2

(12) United States Patent
Bludsky et al.

(10) Patent No.: US 12,694,742 B2
(45) Date of Patent: Jul. 28, 2026

(54) SMART ATM CASSETTE

(71) Applicant: Capital One Services, LLC, McLean, VA (US)

(72) Inventors: Matej Bludsky, Germantown, MD (US); Jeba Angeline George, Wilmington, DE (US); Michael James Kidd, Litchfield, NH (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/901,799

(22) Filed: Sep. 30, 2024

(65) Prior Publication Data

US 2026/0094484 A1 Apr. 2, 2026

(51) Int. Cl.

| | |
|---|---|
| ***G07D 11/12*** | (2019.01) |
| ***G07D 7/12*** | (2016.01) |
| ***G07D 11/235*** | (2019.01) |
| ***G07D 11/60*** | (2019.01) |

(52) U.S. Cl.

CPC ............... *G07D 11/12* (2019.01); *G07D 7/12* (2013.01); *G07D 11/235* (2019.01); *G07D 11/60* (2019.01)

(58) Field of Classification Search

CPC ........ G07D 11/12; G07D 7/12; G07D 11/235; G07D 11/60

See application file for complete search history.

(56) References Cited

U.S. PATENT DOCUMENTS

| | | | | |
|---|---|---|---|---|
| 8,559,694 | B2 | 10/2013 | Jenrick et al. | |
| 9,558,418 | B2 | 1/2017 | Jones et al. | |
| 9,761,091 | B2 | 9/2017 | Turocy et al. | |
| 11,172,776 | B1 * | 11/2021 | Logan | G08B 13/14 |
| 11,526,861 | B1 * | 12/2022 | Goetz | G05D 1/0202 |
| 2025/0373950 | A1 * | 12/2025 | Gonzalez-Candela | H04N 23/56 |

FOREIGN PATENT DOCUMENTS

| | | | | |
|---|---|---|---|---|
| CN | 111489488 | A * | 8/2020 | |
| CN | 113989977 | A * | 1/2022 | G07F 17/26 |
| KR | 20200141600 | A * | 12/2020 | G10L 15/22 |

* cited by examiner

*Primary Examiner* — Sonji N Johnson

(74) *Attorney, Agent, or Firm* — Bookoff McAndrews, PLLC

(57) ABSTRACT

Systems and methods are disclosed for a smart automated teller machine cassette. One cassette system includes a housing that defines an interior of the cassette, and that is configured to house a plurality of currency notes, a camera sensor configured to capture at least one image of each note of the plurality of currency notes, and a first module configured to determine a cassette status based on feature data determined from the at least one image of each note of the plurality of currency notes.

20 Claims, 3 Drawing Sheets

SMART ATM CASSETTE

TECHNICAL FIELD

Various embodiments of the present disclosure relate generally to automated teller machines and, more particularly, to a smart cassette system of an automated teller machine.

BACKGROUND

An automated teller machine (ATM) performs banking functions such as accepting cash deposits and executing cash withdrawals. Cash in an ATM is stored in replaceable ATM cassettes, with each cassette typically being dedicated to a specific cash denomination. When an ATM is running low on a certain denomination, a technician must open the ATM and restock the ATM cassette with the correct bill denomination, quantity, and in a correct manner.

When reloading an ATM cassette with cash, errors can be made. For example the wrong denomination or currency may be loaded into a cassette (e.g., cross-loading). A cassette may be overloaded causing it to malfunction (e.g., jam) when dispensing money during future cash withdrawals. Counting errors may occur such as in instances where loaded cash is folded or damaged or where a human or machine counting the bills malfunctions. Additionally, settlement and logging errors may occur when a technician needs to account for the changes within the ATM cassette. Furthermore, reloading or maintaining an ATM exposes its cash contents out in the open and increases safety risks as an open ATM may entice a bystander to forcibly rob the technician and the open ATM.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for an automated teller machine (ATM) cassette.

In some aspects, the techniques described herein relate to a cassette including: a housing that defines an interior of the cassette, and that is configured to house a plurality of currency notes; a camera sensor configured to capture at least one image of each note of the plurality of currency notes; and a first module configured to determine a cassette status based on feature data determined from the at least one image of each note of the plurality of currency notes. In some aspects, the techniques described herein relate to a cassette, wherein the feature data of each note includes at least one of a denomination, a currency, and a date and time stamp. In some aspects, the techniques described herein relate to a cassette, wherein the feature data includes, for the plurality of currency notes, at least one of a note count for the denomination and a total amount value of the currency. In some aspects, the techniques described herein relate to a cassette, wherein capturing the at least on image of each note of the plurality of currency notes occurs when the currency notes pass in front of the camera sensor when dispensing or loading currency notes. In some aspects, the techniques described herein relate to a cassette, further including a memory chip with wireless functionality. In some aspects, the techniques described herein relate to a cassette, wherein the first module is further configured to transmit, via the memory chip, at least one of the cassette status or the feature data to an automated teller machine (ATM) associated with the cassette. In some aspects, the techniques described herein relate to a cassette, further including a user interface on an exterior of the housing, such that an individual can determine a cassette status. In some aspects, the techniques described herein relate to a cassette, further including a Radio Frequency Identification (RFID) chip. In some aspects, the techniques described herein relate to a cassette, further including a first position and a second position, wherein the first position includes aligning a cavity in a position to dispense the currency notes in an automated teller machine, and wherein the second position includes the cavity accessible to receive the currency notes. In some aspects, the techniques described herein relate to a cassette, wherein the cassette is configured to slide in and out of an automated teller machine (ATM).

In some aspects, the techniques described herein relate to a method for operating a cassette including: capturing, via a camera sensor associated with the cassette, at least one image of each note of a plurality of currency notes housed within a housing that defines an interior of the cassette; and determining, via a first module, a cassette status based on feature data determined from the at least one image of each notes of the plurality of currency notes. In some aspects, the techniques described herein relate to a method, wherein the feature data of each note includes at least one of a denomination, a currency, and a date and time stamp. In some aspects, the techniques described herein relate to a method, wherein the feature data includes, for the plurality of currency notes, at least one of a note count for the denomination and a total amount value of the currency. In some aspects, the techniques described herein relate to a method, further including: transmitting the cassette status to an automated teller machine (ATM) associated with the cassette. In some aspects, the techniques described herein relate to a method, further including storing the cassette status on a memory chip with wireless functionality, the memory chip associated with the cassette. In some aspects, the techniques described herein relate to a method, wherein the capturing at least one image of each of a plurality of currency occurs when each note of the plurality of currency notes moves in front of the camera sensor. In some aspects, the techniques described herein relate to a method, wherein the determining a cassette status further includes using a trained machine learning model to infer a cassette status based on the feature data determined from the at least one image of the plurality of currency. In some aspects, the techniques described herein relate to a method, wherein the trained machine learning model has been trained by: receiving, as training data, a plurality of images of a plurality of currency and a plurality of feature data associated with the plurality of currency; and training a machine learning model, using the training data, to infer the cassette status. In some aspects, the techniques described herein relate to a method, further including: causing to output the cassette status via one or more of an application programming interface external to the housing, a graphical user interface (GUI) associated with an automated teller machine (ATM), or a GUI associated with a user device.

In some aspects, the techniques described herein relate to a cassette including: a housing that defines an interior of the cassette, and that is configured to house a plurality of currency notes; a drawer that is able to be arranged into a first position and a second position, wherein the first position includes aligning a cavity in a position to dispense the currency notes in an automated teller machine, and wherein the second position includes the cavity accessible to receive the currency notes; a memory chip with wireless functionality; a Radio Frequency Identification (RFID) chip; a camera configured to capture at least one image of each of the plurality of currency; and a first module configured to determine a cassette status based on feature data determined from the at least one image of each note of the plurality of currency notes.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments described herein, the exemplary disclosed ATM cassettes will be less prone to errors and will reduce opportunities for theft. The disclosed systems and methods discussed below may allow for a smart ATM cassette to monitor its contents and ensure correct loading, logging, and settling when replacing a cassette of an ATM. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
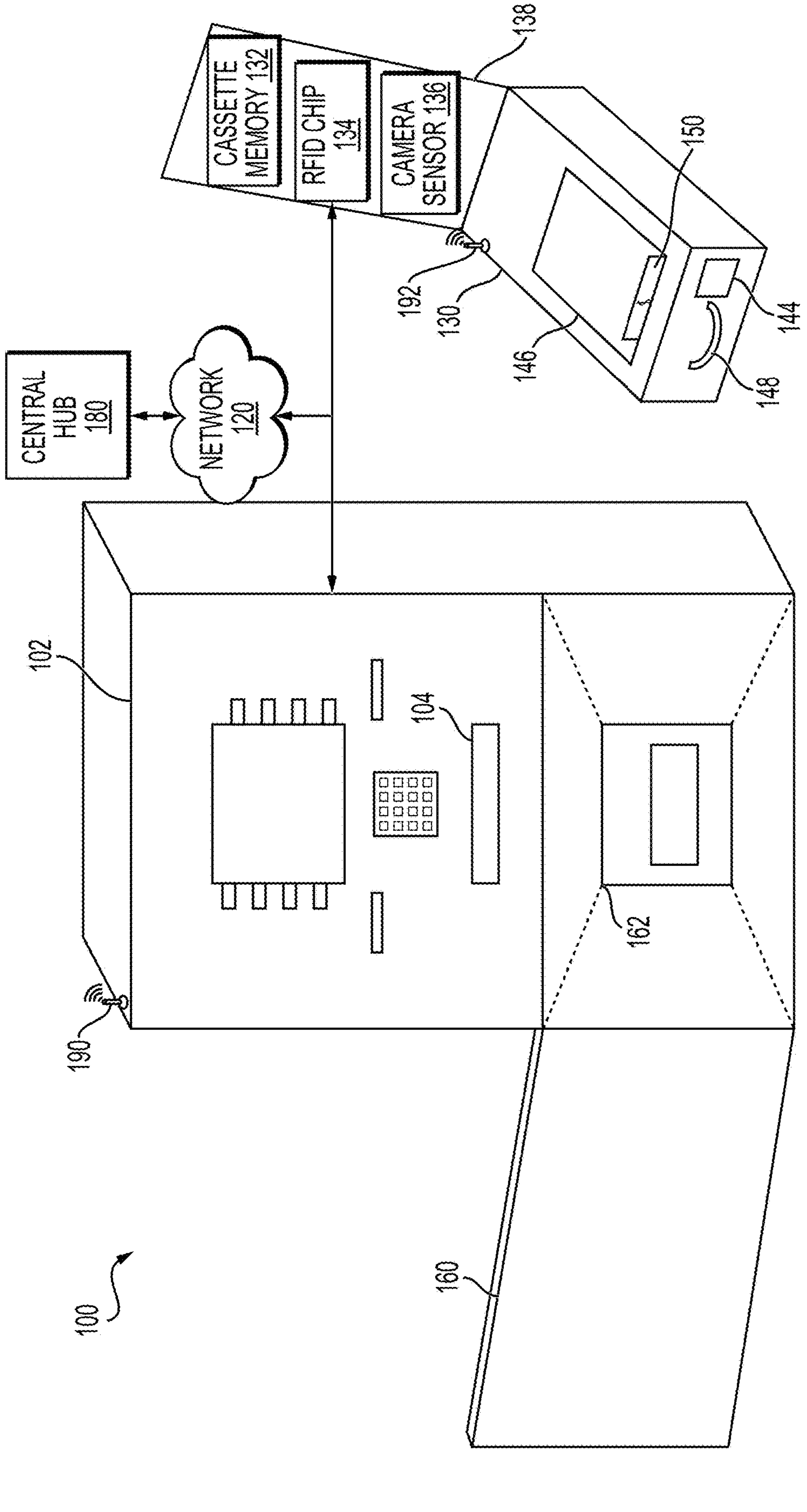
FIG. 1 depicts an exemplary system infrastructure for an ATM cassette environment, according to one or more embodiments.

Various embodiments of the present disclosure relate generally to automated teller machines (ATMs) and, more particularly, to a smart cassette system of an automated teller machine.

Reference to any particular activity is provided in this disclosure only for convenience and not intended to limit the disclosure. A person of ordinary skill in the art would recognize that the concepts underlying the disclosed devices and methods may be utilized in any suitable activity. For example, while the disclosure and appended drawings describe environments utilizing an ATM, the disclosure is not so limited. Rather, the techniques disclosed herein may be applicable to other structures and activities such as kiosks, terminals, etc. In some arrangements, such other structures may require reloading or maintenance and may be configured for dispensing materials (e.g., documents, notes, records, checks, images, legal tender, cash, coins, etc.). The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," "about," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, a "machine-learning model" generally encompasses instructions, data, or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration. By virtue of such training, a machine-learning model is converted from an un-trained and un-specific model to a model that is unique to and specifically configured for the particular purpose for which it is trained. In an example, training of a machine-learning model is analogous to a method of production in which the article produced is the trained model having unique characteristics by virtue of its particular training. Moreover, the result of training a machine-learning model using particular training data and for a particular purpose results in a technical solution to an inherently technical problem.

The execution of the machine-learning model may include deployment of one or more machine learning techniques, such as linear regression, logistical regression, random forest, gradient boosted machine (GBM), deep learning, or a deep neural network. Supervised or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

FIG. 1 and the following discussion provide a brief, general description of a suitable ATM environment in which the present disclosure may be implemented. In one embodiment, any of the disclosed systems, methods, or graphical user interfaces may be executed by or implemented by an ATM system consistent with or similar to that depicted in FIG. 1. Although not required, aspects of the present disclosure are described in the context of computer-executable instructions, such as routines executed by a data processing device, e.g., a server computer, wireless device, or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, multi-processor systems, microprocessor-based or programmable consumer electronics, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer or data processor that is specifically programmed, configured, or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), or the Internet. Similarly, techniques presented herein as involving multiple devices may be implemented in a single device. In a distributed computing environment, program modules may be located in both local and remote memory storage devices.

Aspects of the present disclosure may be stored or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

In an example, an ATM, e.g., a cassette of an ATM, may require being replaced, reloaded, or otherwise maintained. Conventional systems and methods of replacing, reloading or maintaining such ATM cassettes may be prone to human or machine error (e.g., miscounted quantity of bills, cross-loading of monetary denominations of cassettes, jamming, etc.) and may expose a technician or the contents of the ATM to fraud or other dangerous or detrimental activities. In an exemplary use case according to one or more aspects of this disclosure, such concerns are ameliorated by the utilization of a smart cassette. Such a cassette may include one or more sensors (e.g., cameras) configured to capture images of bills. Processing these images may allow for accurate accounting of an ATM cassette's inventory. For example, processing images of the bills may be useful in determining a bill count, a denomination, or damaged or folded bills. Processing images to determine ATM cassette information may be more accurate and efficient than the conventional method of individuals manually counting or inspecting bills as they are being loaded into an ATM cassette. In addition, because the bills are able to be inventoried off-site using captured images, technicians need only to swap out a depleted or soon-to-be depleted cassette for a fully (or more) stocked cassette. Traditionally, technicians would manually sort and count bills when reloading or servicing an ATM which may expose an open ATM (and the servicing technician) to the public and possible fraud or thieves. Being able to replace one cassette for another, without having to sort or count bills, may significantly reduce exposure risk for ATM servicing technicians and reduce potential fraud.

FIG. 1 depicts an ATM environment 100, including an ATM 102 and ATM cassette 130. ATM 102 may be a device that allows customers of financial institutions (e.g., account holders) to perform various banking transactions without the need for a human teller. These transactions typically include cash withdrawals, deposits, balance inquiries, fund transfers, or bill payments, etc. ATM 102 may be located in public places (e.g., high traffic areas) such as banks, shopping centers, airports, or stores, to provide convenient access to banking services at any time of the day.

ATM 102 may store one or more ATM cassettes 130, each of which may hold currency 150 therein. Currency 150 may include cash, bills, or other paper currencies. As noted above, in other embodiments, ATM cassettes 130 may hold other items, such as, for example, documents, notes, records, checks, materials for printing images, or other legal tender, etc., and may be configured for containment within a kiosk or terminal. Additionally, while one bill is shown, currency 150 may refer to a plurality of bills.

While ATM 102 may consistently remain at a certain location, ATM cassette 130 may be replaced as cash or contents therein are depleted (e.g., after withdrawals leave cash stock low). Conventionally, in order to replace or service such cassettes, technicians service ATMs by carrying cash to the location of the ATM, opening the ATM and exposing its contents to the public, and settling cash amounts on location, often taking 30-40 minutes and being subject to settling errors. Technicians settle the contents of an ATM cassette by adding an appropriate quantity and denomination of currency. Such conventional settling methods are subject to counting errors as bills may be stuck together and only counted as one bill instead of two. In addition to human error, servicing an ATM in these known manners is dangerous as large amounts of cash are exposed and open to the public for a long duration of time.

An improvement over these known methods includes an exemplary embodiment where settlement of ATM cassette 130 may occur at a central hub 180. Upon receiving notification that an ATM cassette needs to be replaced, ATM cassette 130 may be prepared at central hub 180 to serve as the replacement. Central hub 180 may be a bank, vault, processing facility, or other secure and private location. Once prepared, a technician or transport service may transport ATM cassette 130 to the location of ATM 102. Upon arrival, the technician may open door panel 160 of ATM 102, remove any current ATM cassette (e.g., remove any depleted, malfunctioning, or other cassette scheduled or intended for removal) from ATM cassette receiver 162, and slide in ATM cassette 130. ATM cassette receiver 162 may be a drawer that slides in and out of ATM 102 for easy removal and replacement of an ATM cassette. When sliding ATM cassette 130 into ATM cassette receiver 162, ATM cassette 130 may be positioned in a manner that allows cash from the ATM cassette 130 to be moved (e.g., by rollers, suction cups, levers, or belts) to cash dispensary 104 when cash is to be dispensed.

The removed ATM cassette may then be transported to central hub 180 where settlement, e.g., accounting for the amount of cash that was deposited or received, may occur. The removed ATM cassette may then be restocked or reloaded (e.g., via insertion of cash within housing 146) for future installation into ATM 102. In this manner, preparing and settling of the replaced ATM cassette can occur in a safe and private environment.

With an adequate amount of cash in ATM cassette 130, ATM 102 may enable banking transactions for customers. Before a customer can transact using ATM 102, ATM 102 may require an authentication process, such as through entering a bank card (ATM card or a debit card) and a personal identification number (PIN). ATM 102 may include a slot to receive a bank card and a keypad for providing a PIN, code, or other authentication information. ATM 102 may include a printer for printing a receipt, a graphical user interface with side buttons for receiving customer input, a cash dispensary 104 for receiving and dispersing cash, and a network transmission device 190 for transmitting data to central hub 180 over network 120.

ATM 102 may include a door panel 160 that is lockable and securable, and which may be opened using a key or other unlocking device. Door panel 160 may be opened to provide access to an inner portion of ATM 102. The inner portion of ATM 102 may include ATM cassette receiver 162 arranged to support and position ATM cassette 130. ATM cassette 130 may be positioned in a manner that includes aligning ATM cassette 130 with a cavity so that currency notes may be dispensed by ATM 102. Alternatively, ATM cassette 130 may be positioned in a manner that includes the cavity accessible to receive notes of currency. For example, ATM cassette 130 may rest on tracks of ATM cassette receiver 162 that allow ATM cassette 130 to slide in and out of (or otherwise move relative to) ATM cassette receiver 162. While only one cassette is shown in this exemplary embodiment, it is within the scope of this description that ATM 102 may include a plurality of cassettes for different denominations. For example, in some arrangements, one or more cassettes may be stocked with a first denomination (e.g., one dollar bills), one or more cassettes may be stocked with a second denomination (e.g., five dollar bills), and so forth. In such a manner, ATM 102 may be equipped to receive and provide a variety of denominations of bills, as needed.

At the end of ATM cassette receiver 162, housing 146 may be arranged to receive and store one or more paper currency until one or more paper currency is transported via belts, conveyors, or other known methods in the art to cash dispensary 104.

ATM cassette 130 may include a cassette lid 138, which may be used to open and close ATM cassette 130 and a handle 148 which may be used to slide ATM cassette 130 into or out of ATM cassette receiver 162. Handle 148 may also be used when carrying ATM cassette 130, such as during transport.

ATM cassette 130 may include cassette memory 132, a radio frequency identification (RFID) tag 134, camera sensor 136, and cassette antenna 192. Cassette memory 132 may include a memory chip and processor configured to store data and information such as identification, tracking, or event data related to ATM cassette 130. This information may be transmitted over network 120 to central hub 180 for processing. Alternatively, information may be transmitted from cassette antenna 192 to network transmission device 190 which may then transmit the information over network 120 to central hub 180. It should be appreciated that information may be transmitted from ATM cassette 130 to central hub 180 directly or through other intermediary devices. In one exemplary embodiment, information from cassette memory 132 may be directly wired to central hub 180 for transmission. For example, when ATM cassette 130 is physically removed and transported to central hub 180 for reloading, a wired or wireless connection may be established to facilitate the transfer of information between ATM cassette 130 and central hub 180.

In another exemplary embodiment, informational data may be written on cassette memory 132 when a technician prepares ATM cassette 130 for use. For instance, upon completion of loading ATM cassette 130, a technician may input information related to the contents loaded in ATM cassette 130, e.g., the denomination, quantity, or currency, using user interface 144. The user interface 144 may then transmit the data to cassette memory 132 where the information input by the technician is written on cassette memory 132 and stored as data.

In another exemplary embodiment, a technician may input information into user interface 144 to log the date and time that ATM cassette 130 is installed into ATM 102. The log data may then be transferred by electronic connection and written to cassette memory 132 for storage. The log data may be directly transmitted to central hub 180 using network transmission device 190, or it may be transmitted to ATM 102 through network transmission device 190 and cassette antenna 192. In this example, network transmission device 190 may then transmit the data to central hub 180 over network 120. It may also be appreciated that other types of data or information may be received by input through user interface 144 and then transmitted and stored on cassette memory 132.

Data and information from RFID tag 134 may be transmitted and stored on cassette memory 132. RFID tag 134 may comprise an integrated circuit and an antenna. In one exemplary embodiment, an RFID tag 134 may be used to provide information (e.g., a unique cassette identifier, currency, or denomination). In another exemplary embodiment, a technician may use an RFID reader and scan RFID tag 134 in order to log an event, such as replacing a depleted or soon to be depleted ATM cassette. In this example, after replacing a depleted or soon to be depleted ATM cassette, a technician may scan RFID tag 134 to indicate completing the replacement. RFID tag 134 may transmit, via an antenna, a signal to cassette memory 132 that logs the date and time the technician replaced the depleted ATM cassette. In this manner, a log of when an ATM cassette is replaced may be written and stored using cassette memory 132. In another exemplary embodiment, the log may be transmitted directly to central hub 180 using cassette antenna 192 or it may be transmitted to ATM 102 using cassette antenna 192 and network transmission device 190, after which ATM 102 may transmit the information to central hub 180 over network 120.

Other data, such as image data from camera sensor 136 may be transmitted and stored on cassette memory 132. In one exemplary embodiment, images captured via camera sensor 136 may be transmitted and stored in cassette memory 132. In another embodiment, informational data from camera sensor 136 may be stored. For example, information that logs when images are being captured by camera sensor 136, such as when currency 150 is being moved for processing a cash dispensing in response to a withdrawal request by a customer, may be transferred to and stored on cassette memory 132. In this example, cassette memory 132 may receive a data transmission from camera sensor 136 as the sensor determines that currency 150 is being moved for processing, such as during dispensing or receiving deposits. In another example, camera sensor 136 may capture images of each note as it is transported and processed and then transfer those images to be stored and written to cassette memory 132. In another embodiment, camera sensor 136 may transmit a time stamp or time signature to accompany any of the previously mentioned memory items.

In one exemplary embodiment, the images and/or time stamp or time signatures may be transmitted directly to central hub 180 using cassette antenna 192. Alternatively, the data may be transmitted to ATM 102 using cassette antenna 192 and network transmission device 190, after which ATM 102 may transmit the information to central hub 180 over network 120. At central hub 180 the image data and information may be processed and stored and will be discussed in greater detail below.

Information stored on cassette memory 132 may also be read. For example, a technician may arrive at the location of an ATM and may need to determine the contents of an ATM cassette. Using user interface 144 the technician may request information related to the stored contents of ATM cassette 130. After inputting a request to view content information using user interface 144, a signal may be transmitted to cassette memory 132 to recall the requested information. The information may then be read and transmitted back to user interface 144 for display. The display may show a quantity, denomination, currency, or other information or combinations of information. For example, the display may read, "Count: 200," "twenty-dollar bills," "US dollars," or "200 US twenty-dollar bills."

In another exemplary embodiment, a technician may scan RFID tag 134 which may send an electric signal to cassette memory 132 to automatically transmit information related to ATM cassette 130 to user interface 144. It may be appreciated that data may be transferred, stored, and displayed by utilizing various combinations of cassette memory 132, RFID tag 134, camera sensor 136, and user interface 144.

RFID tag 134 may use radio waves to transmit information wirelessly. For example, RFID tag 134 may contain stored information and an antenna that enables communication with an RFID reader. In one exemplary embodiment, when RFID chip comes into the proximity of an RFID reader, it may receive electromagnetic energy from the reader's radio waves, which powers RFID tag 134 to transmit stored information to the reader. RFID tag 134 may serve as an access card, such as for verification, or a key fob for technicians that are to perform maintenance on ATM cassette 130. RFID tag 134 may be used to manage or monitor movement, such as when ATM cassette 130 is being transported from a central hub 180 to an ATM location or from an ATM location back to a central hub 180 for refilling.

Another exemplary embodiment may include an individual, or technician, providing authentication information using RFID tag 134, such as by scanning a Quick Response (QR) code displayed on user interface 144 located on the exterior of ATM cassette 130. Once authorized, user interface 144 may prompt a technician to remove and replace ATM cassette 130. In another exemplary embodiment, after a technician completes an authentication process, user interface 144 may output and display the status of ATM cassette 130. Status information may include whether ATM cassette 130 is full, partially full, or empty in percentages (or other quantifiable or qualitative measure such as text suggesting a level of how full or a color indicative of a need or lack thereof for service) and may include a quantity count of the remaining bills. User interface 144 may also display information such as denomination, amount, quantity, time, or other information that would be useful to a technician. While a quantifiable measure such as percentage full is described, in other embodiments, other quantifiable or qualitative measures may be utilized to convey information to a technician. For example, a number of remaining bills, a pictorial gauge (e.g., a bar graph, a color identifier (e.g., where green indicates a number of bills above a first threshold, red indicates a number of bills below a second threshold, and yellow indicates a number of bills equal to or between the first and second thresholds), a gauge similar to a fuel gauge ranging between empty and full, etc.) or a category such as low, satisfactory, full.

Status information may be output via one or more application programming interfaces (external to the ATM cassette 130), a graphical user interface (GUI) associated with an automated teller machine (ATM), or a GUI associated with a user device. After replacing ATM cassette 130 in ATM cassette receiver 162, the technician may again scan RFID tag 134 to record replacement of the ATM cassette. The recorded information may be transmitted to central hub 180 using cassette antenna 192. Alternatively, the information may be transmitted to ATM 102 using cassette antenna 192 and network transmission device 190 and then transmitted to central hub 180.

ATM cassette 130 may include a camera sensor 136 configured to capture an image of currency 150. Camera sensor 136 may capture images of cash as the cash passes in front of camera sensor 136, either as it is being loaded or dispensed from ATM cassette 130. Camera sensor 136 may be able to capture images that include details such as currency, denomination, or date and may capture edges of bills for counting purposes. In another embodiment, when a replaced ATM cassette is returned to central hub 180 for reloading, the images captured by camera sensor 136 may be transferred from cassette memory 132 to a computing device at central hub 180 for processing. In this manner, images related to transactions from ATM cassette 130 may be used to verify transactions, such as how many bills are deposited or dispensed.

Camera sensor 136 may capture a single image or a series of image frames to make a video. In one exemplary embodiment, camera sensor 136 may be continuously recording or capturing images. In another exemplary embodiment, camera sensor may be automatically turned on based on a triggering event. Triggering events may be related to light sensitivity, movement, or opening of cassette lid 138.

The images and accompanying metadata may be stored at cassette memory 132, transmitted to central hub 180 using cassette antenna 192, or may be transmitted to ATM 102 using network transmission device 190 and cassette antenna 192 after which it may then be transferred over network 120 to central hub 180 for processing.

An interior of ATM cassette 130 may include housing 146 configured to hold and store cash or currency 150. Housing 146 may include a spring loaded divider that secures currency 150 in place and at the same time urges currency 150 towards a processing area for transporting currency 150 (e.g., by rollers, suction cups, levers, or belts) when it is to be dispensed through cash dispensary 104. Other dispensing methods that are known in the art may also be employed.

Figure 2:
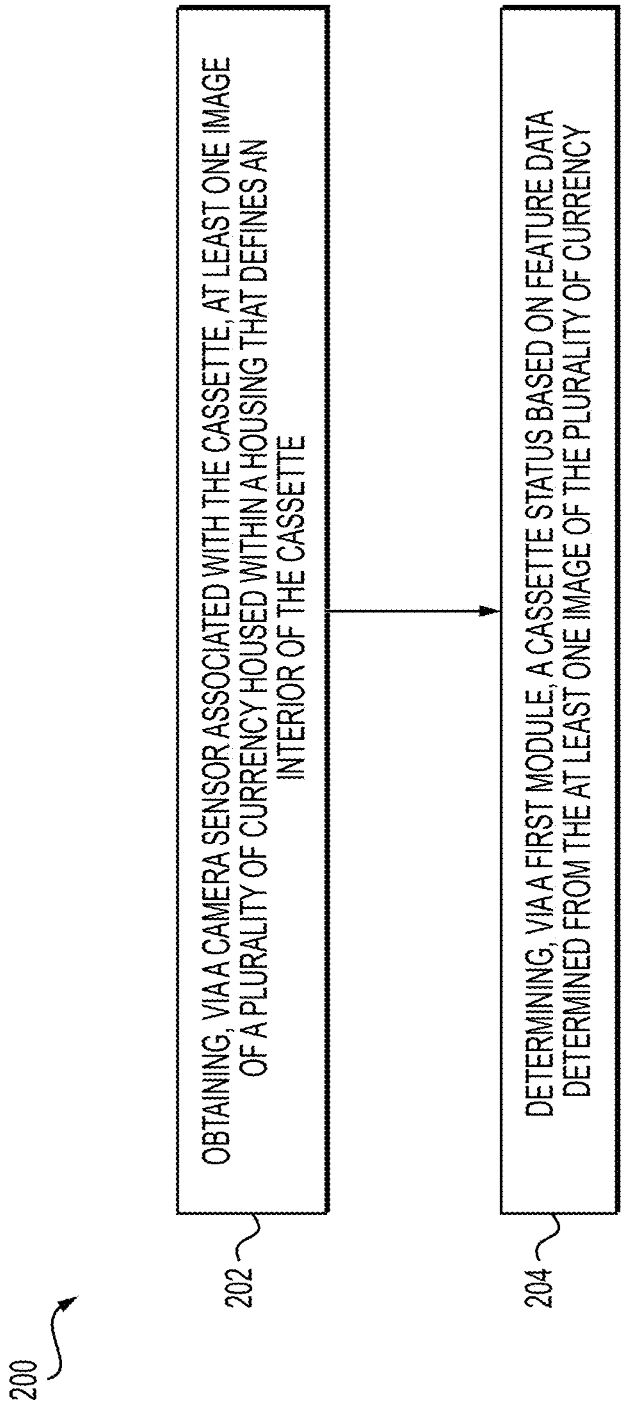
FIG. 2 depicts a flowchart of a method for determining a status of an ATM cassette, according to one or more embodiments.

FIG. 2 provides a flowchart depicting an exemplary method 200 for ATM cassette 130 of FIG. 1. In an exemplary embodiment, the process may perform step 202 of obtaining, via a camera sensor 136 associated with the ATM cassette 130, at least one image of currency 150 housed within a housing that defines an interior of the ATM cassette 130. Step 202 may take place when cash is being loaded into ATM cassette 130 or as cash is being dispensed during a transaction performed at ATM 102. In another exemplary embodiment, camera sensor 136 may be associated with ATM 102 and may be arranged to capture images as cash is being dispensed or deposited.

In one exemplary embodiment, an ATM cassette 130 may be refilled with currency notes at central hub 180. ATM cassette 130 may include housing 146 arranged to store currency 150. In one instance, a spring loaded lever may be held in a tensioned position to allow for loading currency 150 into housing 146. After loading currency 150, releasing the spring loaded lever may urge currency 150 towards a processing area for transporting currency 150 (e.g., by rollers, suction cups, levers, or belts) when it is to be dispensed through cash dispensary 104 Camera sensor 136 may capture images of the notes as each note passes in front of camera sensor 136 due to the urging of the spring loaded lever.

Another exemplary embodiment may include an ATM cassette 130 positioned in ATM cassette receiver 162 of ATM 102. A customer may have requested to withdraw $100 in the form of five twenty-dollar bills. As ATM 102 processes this transaction, five twenty-dollar bills may be retrieved from an ATM cassette 130 arranged to store currency 150 in twenty-dollar denominations. Five of the twenty-dollar bills may be moved from housing 146 to cash dispensary 104, such as by rollers, suction cups, levers, or belts, when it is to be dispensed through cash dispensary 104 and during this process, the movement of these bills may include passing in the view of camera sensor 136. As each twenty-dollar bill passes in the view of camera sensor 136, an image may be captured before the notes pass through cash dispensary 104, such as when the cash is leaving housing 146, e.g., by rollers, suction cups, levers, or belts. Alternatively, a series of images may be captured so as to capture a video recording of the five twenty-dollar bills as they pass in the view of camera sensor 136.

In the exemplary embodiment, the process may perform step 204 of determining, via a first module, a cassette status based on feature data determined from the at least one image of the plurality of currency. The first module may be part of ATM environment 100. In one exemplary embodiment, the first module may be contained at central hub 180 upon ATM cassette 130 transmitting image data to central hub 180. The image data may be transferred to central hub 180 directly through cassette antenna 192, or the image data may be transferred to ATM 102 using cassette antenna 192 and network transmission device 190, and then ATM 102 transmitting the image data over network 120 to central hub 180 using network transmission device 190.

In an exemplary embodiment, central hub 180 may determine feature data by processing image data from cassette memory 132. Feature data may include a denomination, a currency, or a date and time associated with when the feature data is determined. For example, feature date may include that US currency in twenty-dollar denominations were withdrawn on Aug. 4, 2023. Feature data may include currency identification features such as a serial number or a mint year. Additionally, feature data may include bill condition, such as whether a bill has tears, frays, markings, discoloration, other imperfections, or if it is in mint condition. This type of feature data may be useful in instances where a consumer may be claiming that a bill or note from ATM 102 was damaged. Feature data may include that one of the five twenty-dollar bills was damaged. This information would substantiate the consumer and support providing a refund or credit to the consumer. Alternatively, the feature data may include that all five-twenty dollar bills were in new or close to new condition. In this instance, the feature data would be useful in preventing fraud.

Feature data may include quantities or amounts, such as an amount of a specific denomination, an amount or total value of a specific currency. For example, feature data may include that five bills were withdrawn for a total amount of $100. Each of the feature data may include a time stamp associated with a recording event. In this example, it may be recorded that the transaction took place at 3:08 am. Other times stamps may also include when currency 150 is being loaded or when it is being dispensed.

Feature data may be determined using a processing computer. A processing computer may utilize one or more of algorithms, text-recognition methods, image analysis, or vector analysis to determine feature data. In another exemplary embodiment, feature data may be determined using a trained machine learning model.

According to machine learning model implementation, feature data may be determined by a feature data machine learning model. The feature data machine learning model may be trained using training data that includes one or more identified features such as denomination, currency type, date, condition, color, minting location, images, watermarks, folds or tears, serial numbers, unique markings, discoloration, or imperfections of historical information from previously analyzed currency. The training data may be tagged such that the feature data machine learning model may correlate components of the training data. A trained feature data machine learning model may receive inputs, such as an image of a note, and may output feature data based on such an image. For example, a first image may be determined to have a first set of feature data which may be different relative to a second image determined to have a second set of feature data. In one example, a trained feature data machine learning model may determine a threshold to use when determining a denomination of a bill. In this example, a trained feature data machine learning model may analyze features of currency 150 and determine that currency 150 in ATM cassette

130 includes $1 bills. This determination may be based on the trained feature data machine learning model determining it is 90% confident that currency 150 includes $1 bills and a threshold requirement of an 80% confidence rating.

Determining a cassette status may be based on the determined feature data. In one exemplary embodiment, a cassette status may be in the form of a percentage or quantity. For example, a cassette status may include that ATM cassette 130 is 33% full or that there are 530 bills remaining. In another exemplary embodiment, determining a cassette status may include using a trained machine learning model to infer a cassette status based on the feature data.

A trained machine learning model may be used for determining a cassette status, or the feature data machine learning model may also determine, as part of determining feature data, also determine a cassette status. In an exemplary embodiment, a trained machine learning model may be trained to receive feature data and determine a cassette status. For example, a cassette status machine learning model may be trained using training data that includes one or more feature data from previously analyzed cassette statuses. The training data may be tagged such that the cassette status machine learning model may correlate components of the training data. A trained cassette status machine learning model may receive inputs (feature data), and may output a cassette status of an ATM cassette based on the feature data. For example, a first set of feature data may be analyzed to determine a first cassette status of an ATM cassette, which may be different relative to a second set of feature data determined to have a second cassette status.

Figure 3:
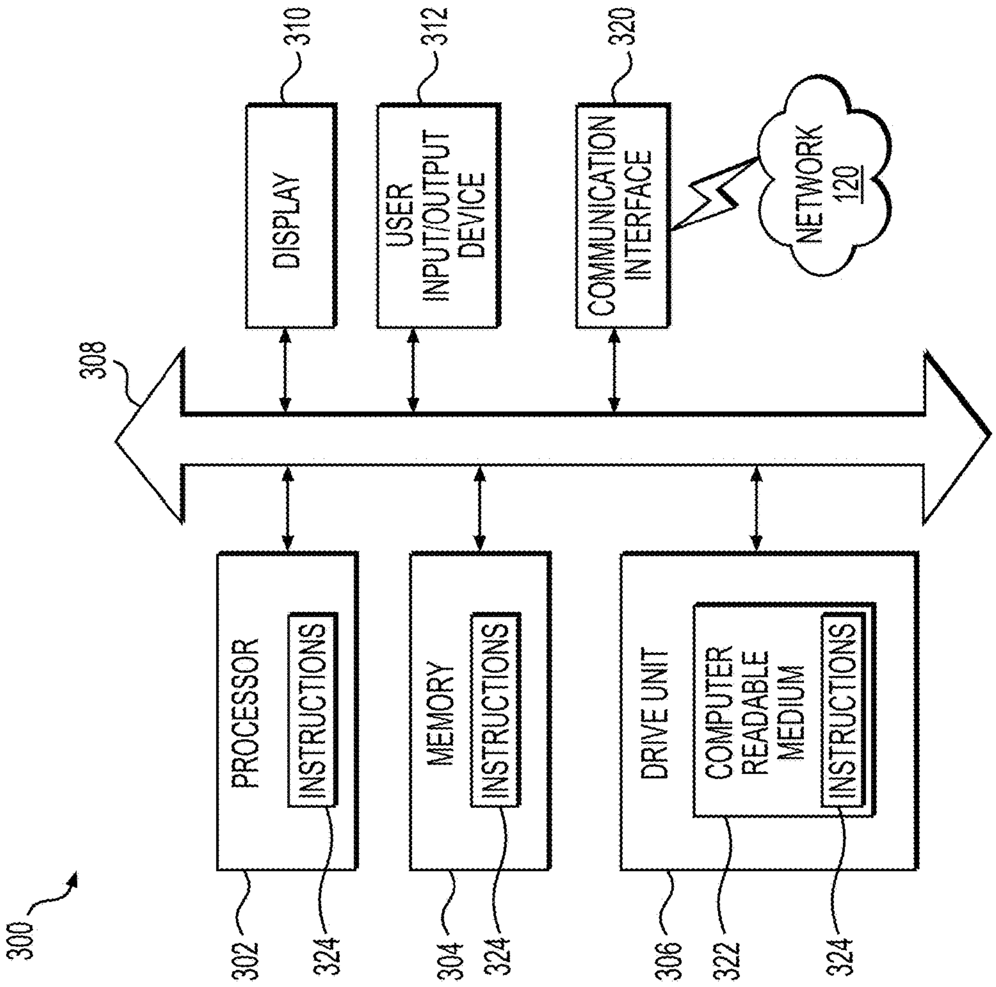
FIG. 3 depicts a block diagram of an exemplary computer 300, according to one or more embodiments.

FIG. 3 depicts a computer 300, such as a system or device implementing a process or operation in the examples above, and may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

FIG. 3 is a simplified functional block diagram of a computer 300 that may be configured as a device for executing processes or operations depicted in, or described with respect to, FIG. 1, according to exemplary embodiments of the present disclosure. For example, the computer 300 may be configured as a part of one of ATM 102 or central hub 180, or another device according to exemplary embodiments of this disclosure. In various embodiments, any of the systems herein may be a computer 300 including, e.g., a data communication interface 320 for packet data communication. The computer 300 may communicate with one or more other computers using the network 120. The network 120 may include a wired or wireless network similar to the network 120 depicted in FIG. 1.

The computer 300 may include a central processing unit ("CPU"), in the form of one or more processors 302, for executing program instructions 324. The program instructions 324 may include instructions for running an application (e.g., if the computer 300 is a server for central hub 180). The computer 300 may include an internal communication bus 308, and a drive unit 306 (such as read-only memory (ROM), hard disk drive (HDD), solid-state disk drive (SDD), etc.) that may store data on a computer readable medium 322, although the computer 300 may receive programming and data via network communications. The computer 300 may have a memory 304 (such as random access memory (RAM)) storing program instructions 324 for executing techniques presented herein, although program instructions 324 may be stored temporarily or permanently within other modules of computer 300 (e.g., one or more processors 302 or computer readable medium 322). The computer 300 may include user input and output ports 312 or a display 310 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A removable cassette comprising:

a housing that defines an interior of the cassette, and that is configured to house a plurality of currency notes;

a user interface on an exterior of the housing, the user interface receiving input from a user and configured to display information to the user;

a camera sensor configured to automatically activate and capture at least one image of each note of the plurality of currency notes, the camera sensor automatically activated based on a triggering event related to light sensitivity; and a processor configured to determine a cassette status based on feature data determined from the at least one image of each note of the plurality of currency notes.

2. The cassette of claim 1, wherein the feature data of each note includes at least one of a denomination, a currency, or a date and time stamp.

3. The cassette of claim 2, wherein the feature data includes, for the plurality of currency notes, at least one of a note count for the denomination or a total amount value of the currency.

4. The cassette of claim 1, wherein capturing the at least one image of each note of the plurality of currency notes occurs when the currency notes pass in front of the camera sensor when dispensing or loading currency notes.

5. The cassette of claim 1, further comprising a memory chip with wireless functionality.

6. The cassette of claim 5, wherein the processor is further configured to transmit, via the memory chip, at least one of the cassette status or the feature data to an automated teller machine (ATM) associated with the cassette.

7. The cassette of claim 1, wherein the user interface on the exterior of the housing displays a cassette status.

8. The cassette of claim 1, further comprising a Radio Frequency Identification (RFID) chip.

9. The cassette of claim 1, further comprising a first position and a second position, wherein the first position includes aligning a cavity in a position to dispense the currency notes in an automated teller machine, and wherein the second position includes the cavity accessible to receive the currency notes.

10. The cassette of claim 1, wherein the cassette is configured to slide in and out of an automated teller machine (ATM).

11. A method for operating a removable cassette comprising:

detecting a triggering event based on movement of the cassette;

capturing, via a camera sensor that is automatically activated based on the triggering event, at least one image of each note of a plurality of currency notes housed within a housing that defines an interior of the cassette;

determining, via a processor, a cassette status based on feature data determined from the at least one image of each notes of the plurality of currency notes; and displaying, via a user interface of the cassette, a cassette status.

12. The method of claim 11, wherein the feature data of each note includes at least one of a denomination, a currency, or a date and time stamp.

13. The method of claim 12, wherein the feature data includes, for the plurality of currency notes, at least one of a note count for the denomination or a total amount value of the currency.

14. The method of claim 11, further comprising:

transmitting the cassette status to an automated teller machine (ATM) associated with the cassette.

15. The method of claim 11, further comprising storing the cassette status on a memory chip with wireless functionality, the memory chip associated with the cassette.

16. The method of claim 11, wherein the capturing at least one image of each of a plurality of currency occurs when each note of the plurality of currency notes moves in front of the camera sensor.

17. The method of claim 11, wherein the determining a cassette status further comprises using a trained machine learning model to infer a cassette status based on the feature data determined from the at least one image of the plurality of currency.

18. The method of claim 17, wherein the trained machine learning model has been trained by:

receiving, as training data, a plurality of images of a plurality of currency and a plurality of feature data associated with the plurality of currency; and training a machine learning model, using the training data, to infer the cassette status.

19. The method of claim 11, further comprising:

outputting the cassette status via one or more of an application programming interface external to the housing, a graphical user interface (GUI) associated with an automated teller machine (ATM), or a GUI associated with a user device.

20. A removable cassette comprising:

a housing that defines an interior of the cassette, and that is configured to house a plurality of currency notes;

a drawer that is able to be arranged into a first position and a second position, wherein the first position includes aligning a cavity in a position to dispense the currency notes in an automated teller machine, and wherein the second position includes the cavity accessible to receive the currency notes;

a memory chip with wireless functionality;

a Radio Frequency Identification (RFID) chip;

a camera configured to automatically activate and capture at least one image of each of the plurality of currency, the camera automatically activated based on a lid of the drawer being opened;

a user interface on an exterior of the housing, the user interface receiving input from a user and configured to display information to the user; and a processor configured to determine a cassette status based on feature data determined from the at least one image of each note of the plurality of currency notes.

* * * * *